United States Patent
Crombez

(10) Patent No.: US 9,079,586 B2
(45) Date of Patent: Jul. 14, 2015

(54) METHOD AND SYSTEM FOR EXTENDING AN OPERATING RANGE OF A MOTOR VEHICLE

(75) Inventor: Dale Scott Crombez, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 496 days.

(21) Appl. No.: 13/029,547

(22) Filed: Feb. 17, 2011

(65) Prior Publication Data

US 2011/0160992 A1    Jun. 30, 2011

(51) Int. Cl.
- G06F 19/00 (2011.01)
- B60W 30/182 (2012.01)
- B60W 50/14 (2012.01)
- B60W 50/00 (2006.01)

(52) U.S. Cl.
CPC ............ B60W 30/182 (2013.01); B60W 50/14 (2013.01); B60W 2050/0095 (2013.01); B60W 2560/02 (2013.01)

(58) Field of Classification Search
CPC ..................... B60W 2540/04; B60W 2560/02; B60W 30/182; Y02T 10/7283; Y02T 10/7275; B60L 15/2045; B60L 2240/80
USPC .......................................................... 701/123
See application file for complete search history.

(56) References Cited

U.S. PATENT DOCUMENTS

| | | |
|---|---|---|
| 5,839,416 A | 11/1998 | Kruiswyk et al. |
| 6,484,088 B1 | 11/2002 | Reimer |
| 7,668,644 B2 | 2/2010 | Tengler et al. |
| 2006/0286419 A1 | 12/2006 | Binder et al. |
| 2007/0298928 A1 | 12/2007 | Yamanaka et al. |
| 2008/0162008 A1 | 7/2008 | Kojima et al. |
| 2008/0182463 A1 | 7/2008 | St.Pierre et al. |
| 2008/0248923 A1 | 10/2008 | Otsubo |
| 2009/0013952 A1 | 1/2009 | Deniston et al. |
| 2009/0058326 A1 | 3/2009 | Oyobe et al. |
| 2010/0063717 A1 | 3/2010 | Proefke et al. |

(Continued)

FOREIGN PATENT DOCUMENTS

| | | |
|---|---|---|
| GB | 2277619 A | 11/1994 |
| JP | 58021048 A1 | 2/1983 |

(Continued)

OTHER PUBLICATIONS

FJR Forum, ECM "economy mode" when fuel light flashing? http://www.fjrforum.com/forum/lofiversion/index.php/t103118.html, May 29, 2009.

(Continued)

Primary Examiner — John Q Nguyen
Assistant Examiner — Kyung Kim
(74) Attorney, Agent, or Firm — Frank A. MacKenzie; Brooks Kushman P.C.

(57) ABSTRACT

A method and system are described for extending an operating range of a motor vehicle, the vehicle having a first mode of operation and an economy mode of operation. A vehicle range may be estimated based on a vehicle fuel level and the first mode of operation. A distance to a fuel location may also be estimated. The economy mode of vehicle operation may be automatically entered a predetermined period of time after the estimated vehicle range based on the vehicle fuel level and the first operating mode decreases to within a predetermined threshold of the estimated distance to a fuel location.

18 Claims, 3 Drawing Sheets

(56) References Cited

U.S. PATENT DOCUMENTS

| | | |
|---|---|---|
| 2010/0106514 A1* | 4/2010 | Cox .......................... 705/1.1 |
| 2010/0250059 A1 | 9/2010 | Sekiyama et al. |
| 2011/0146945 A1 | 6/2011 | Morita et al. |
| 2011/0153178 A1 | 6/2011 | Westendorf |
| 2011/0241827 A1 | 10/2011 | Varoglu |

FOREIGN PATENT DOCUMENTS

| | | |
|---|---|---|
| JP | 58023249 A | 2/1983 |
| JP | 63254257 A | 10/1988 |

OTHER PUBLICATIONS

All Experts Search, Pontiac Repair, 1998 Pontiac Transport Montana, Serial Data Stream, Digital Information, pp. 1-5, May 29, 2009.

Office Action for U.S. Appl. No. 13/029,488 (FMC 3281 PUS) dated Aug. 18, 2011.

Office Action for U.S. Appl. No. 13/029,488 (FMC 3281 PUS) dated Dec. 21, 2011.

Advisory Action for U.S. Appl. No. 13/029,488 (FMC3281PUS) dated Apr. 11, 2012.

* cited by examiner

METHOD AND SYSTEM FOR EXTENDING AN OPERATING RANGE OF A MOTOR VEHICLE

CROSS-REFERENCE TO RELATED APPLICATIONS

This application is related to U.S. application Ser. No. 13/029,488, filed on Feb. 17, 2011, now U.S. Pat. No. 8,447,505, which is incorporated by reference in its entirety herein.

TECHNICAL FIELD

The following relates to extending the operating range of a motor vehicle, particularly a vehicle for use with an alternative fuel, such as an electric vehicle or a fuel cell vehicle, where the vehicle may have a normal mode of operation and an economy mode of operation.

BACKGROUND

Many automotive vehicles, especially alternative fuel powered vehicles such as hybrid electric vehicles, electric vehicles and fuel cell vehicles, are increasingly equipped to provide users with driving or operating modes that attempt to optimize fuel economy. Such driving or operating modes may be referred to as "economy" or "econ" modes of vehicle operation.

An economy mode of vehicle operation may include several changes to the driving or operating behavior of the vehicle. Such changes may include, but are not limited to, limiting the speed of the vehicle, limiting the acceleration of the vehicle, modifying vehicle acceleration response characteristics, and limiting, changing or altering the settings of the climate control system of the vehicle. By improving fuel economy, these types of changes can help to extend the operating range of the vehicle.

A problem associated with alternative fuel powered vehicles, such as hybrid electric, electric, fuel cell, ethanol, E85, propane, or compressed natural gas (CNG) vehicles, is that there are fewer fuel stations or locations than for gasoline or diesel fuel powered vehicles. This can make it difficult for a user of an alternative fuel powered vehicle to travel or plan trips without having to consider vehicle range and the locations of alternative fuel stations. A similar situation may also exist in rural, sparsely populated, or less developed geographic areas with respect to conventional fuel stations for gasoline or diesel, where the number of fuel stations may be limited and those stations may be located at great distances from one another. As well, a problem associated with economy mode vehicle operation is that the vehicle user or driver is required to manually select the economy operating mode, such as by actuating a "button" or other device in the vehicle.

Thus, there exists a need for a method and system for extending an operating range of a motor vehicle, such as a vehicle for use with an alternative fuel, whereby an economy mode of vehicle operation may be entered automatically based on an estimated vehicle range and an estimated distance to a fuel location, thereby assisting a vehicle driver or user to reach a fuel station. Such a method and system, however, would still provide the vehicle driver or user the ability to manually control the vehicle operating mode as between an economy mode and other modes of operation.

SUMMARY

According to one embodiment disclosed herein, a method is provided for extending an operating range of a motor vehicle for use with an alternative fuel, where the vehicle has a first mode of operation and an economy mode of operation. The method comprises estimating a vehicle range based on a vehicle fuel level and the first mode of vehicle operation, and estimating a distance to a fuel location. The method further comprises automatically entering the economy mode of vehicle operation a predetermined period of time after the estimated vehicle range decreases to within a predetermined threshold of the estimated distance to a fuel location.

According to another embodiment, a system is provided for extending an operating range of a motor vehicle for use with an alternative fuel, where the vehicle has a first mode of operation and an economy mode of operation. The system comprises a controller configured to estimate a vehicle range based on a vehicle fuel level and the first mode of vehicle operation, and to estimate a distance to a fuel location. The controller is also configured to generate an entry command signal for use in automatically entering the economy mode of vehicle operation after the estimated vehicle range decreases to within a predetermined threshold of the estimated distance to a fuel location.

According to another embodiment, a system is provided for extending an operating range of a motor vehicle, the vehicle having a first mode of operation and a second mode of operation. The system comprises a controller configured to estimate a vehicle range based on a vehicle fuel level and the first mode of vehicle operation, and to estimate a distance to a fuel location. The controller is also configured to generate, when the estimated vehicle range decreases to within a predetermined range the estimated distance to a fuel location, an information signal for use in providing an indication to a vehicle user that the vehicle will enter the second mode of vehicle operation.

The controller is further configured to generate, if the user fails to provide a command to refrain from entering the second mode of operation during a predetermined period of time after generating the information signal for use in providing the indication to the vehicle user, an entry command signal for use in automatically entering the second mode of vehicle operation. The controller is still further configured to generate an exit command signal for use in exiting the second mode of vehicle operation in response to a user command to exit the second mode of vehicle operation.

A detailed description of these embodiments and accompanying drawings are set forth below.

DETAILED DESCRIPTION

As required, detailed embodiments are disclosed herein; however, it is to be understood that the disclosed embodiments are merely exemplary, and there may be various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art.

As previously discussed, automotive vehicles, especially alternative fuel powered vehicle such as hybrid electric vehicles, electric vehicle and fuel cell vehicles, are increasingly equipped to provide users with driving or operating modes that attempt to optimize fuel economy, which may be referred to as economy modes of vehicle operation. An economy mode may involve several changes to the driving or operating behavior of the vehicle. Such changes may include, but are not limited to, limiting vehicle speed, limiting vehicle acceleration, modifying vehicle acceleration characteristics, and limiting or altering the vehicle climate control system settings. By improving fuel economy, these types of changes can help to extend the operating range of the vehicle.

However, a problem associated with alternative fuel powered vehicles is a dearth of alternative fuel stations as compared to gasoline or diesel fuel stations, making it difficult for a driver or user of such a vehicle to travel or plan trips without having to consider vehicle range or the locations of alternative fuel stations. A similar situation may also exist in rural, sparsely populated, or less developed geographic areas with respect to conventional fuel stations for gasoline or diesel fuel, where the number of fuel stations may be limited and those stations may be located at great distances from one another.

As well, a problem associated with economy mode operation is that the vehicle user or driver is required to manually select the economy operating mode, such as by actuating a "button" or other device in the vehicle. An improved method and system for extending an operating range of a vehicle would provide for automatically entering an economy mode of vehicle operation based on an estimated vehicle range and an estimated distance to a fuel location, yet still provide the vehicle driver or user with the ability to manually control the vehicle operating mode as between an economy mode and other modes of vehicle operation.

Figure 1:
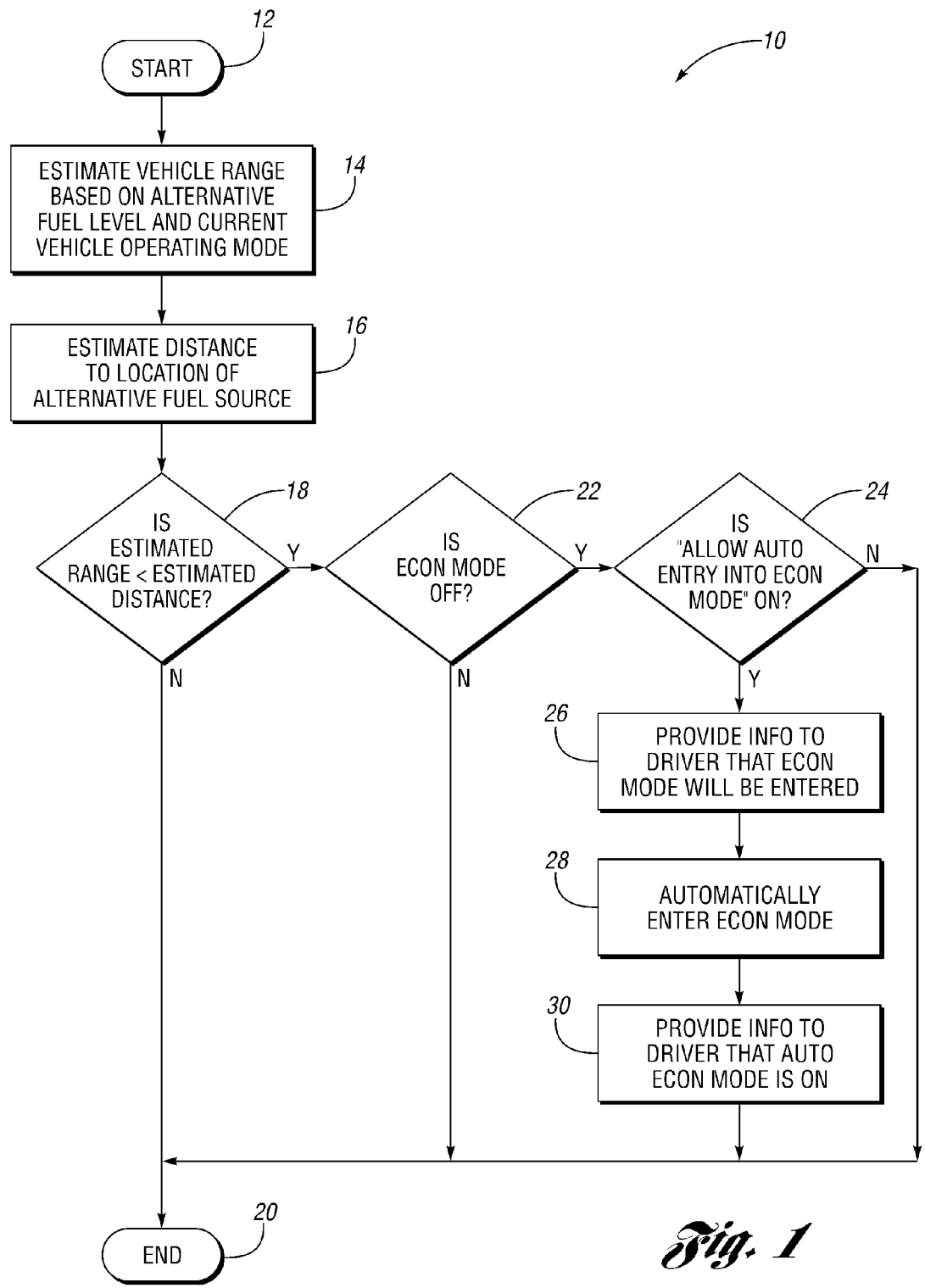
FIG. 1 is a simplified flowchart depicting features of a method and system for extending an operating range of a motor vehicle according to embodiments described herein.
Figure 2:
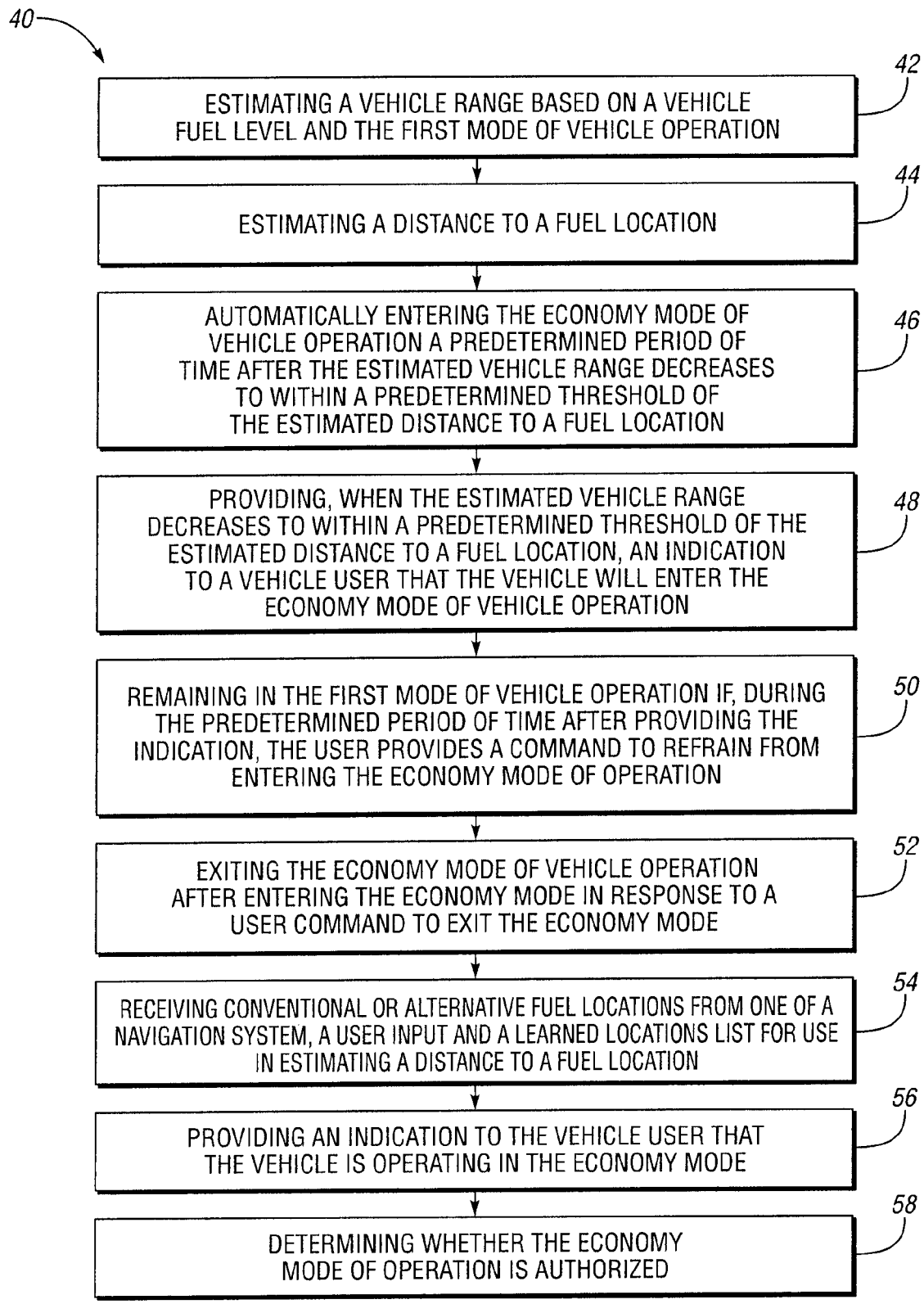
FIG. 2 is a simplified flowchart of a method for extending an operating range of a motor vehicle according to an embodiment described herein.
Figure 3:
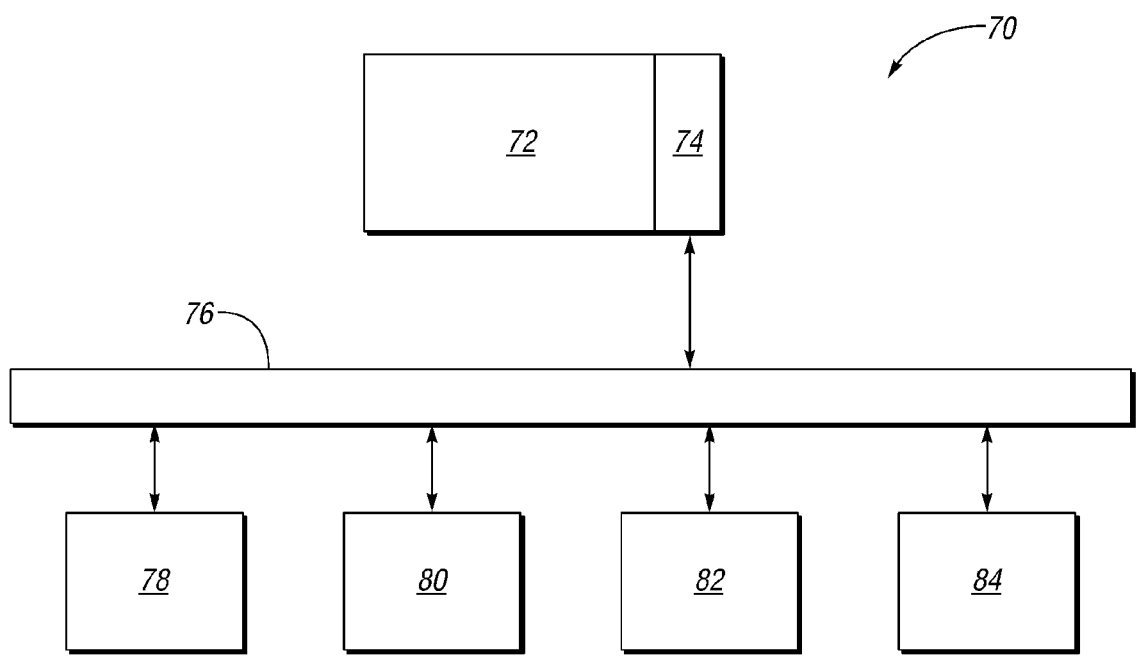
FIG. 3 is a simplified block diagram of a system for extending an operating range of a motor vehicle according to an embodiment described herein.

With reference to FIGS. 1-3, a method and system for extending an operating range of a motor vehicle will now be described. In that regard, the motor vehicle is provided with at least two modes of operation, which may be referred to as a normal mode of vehicle operation and an economy mode of vehicle operation. It should be noted, however, that any number of operating modes may be provided for the vehicle. At least one vehicle operating mode, however, comprises an economy mode of operation that includes changes in the operation of the vehicle, such as limiting the vehicle speed, limiting the vehicle acceleration, modifying vehicle acceleration response characteristics, and/or limiting or altering vehicle climate control system settings to improve fuel economy, thereby extending the operating range of the vehicle. Multiple numbers or types of economy modes of operation may also be provided, such as by employing different combinations of changes in the operation of the vehicle. Vehicle operating modes other than such economy modes may be referred to in any fashion, such as a normal operating mode or any other description. As well, as used herein, a first or a second operating mode may refer to an existing or current vehicle operating mode or a previous vehicle operating mode, which may be an economy mode or an operating mode other than an economy mode Referring now to FIG. 1, a simplified flowchart (10) depicting features of a method and system for extending an operating range of a motor vehicle according to various embodiments described herein is shown. One condition for automatically entering an economy operating mode is a fuel level which, based on a current vehicle operating mode, provides a vehicle range that is less than an estimated distance to a location of a fuel source. It should be noted that the vehicle fuel may be an alternative fuel, such as ethanol, propane, compressed natural gas, electricity for a hybrid electric or electric vehicle, or hydrogen for a internal combustion or fuel cell vehicle, or may be gasoline or diesel fuel for conventional vehicles. Such a condition for automatically entering an economy mode may be coordinated with known systems for indicating low fuel levels, which may include providing a driver with messages, visual indicators and/or audible tones. In that regard, many vehicles include systems that provide an indication to the driver when the fuel level is at a point where an estimated 50 mile range to empty is expected.

As seen in FIG. 1, after start (12), an estimate (14) may be made as to the range of the vehicle based on the current vehicle operating mode and the level of fuel available. As noted above, this may be accomplished in coordination with known systems for indicating low fuel levels. An estimate (16) may also be made as to the distance from the current location of the vehicle to one or more locations of a fuel source. Such an estimate (16) may be made based on information provided by a user, such as by inputting conventional or alternative fuel source locations or distances via a user input. Alternatively, such an estimate (16) may be made based on information provided by a vehicle information or navigation system. In that regard, such information or navigation systems may be configured for communication over a cloud network or networks external to the vehicle, such as the Internet, via communication links such as cellular or other wireless links, as well as for learning conventional or alternative fuel sources previously located, which may be stored in a memory in a database, table, list or any other form. Such alternative fuel source locations may be electric battery charging stations, hydrogen fueling stations, compressed natural gas fueling stations, ethanol fueling stations, propane fueling stations, or any other type of stations for fueling a vehicle powered by fuels other than conventional gasoline or diesel fuels.

After the range of the vehicle and the location or locations of a fuel source have been estimated, such as in the fashion described above, a determination (18) may be made as to whether the estimated vehicle range is within or below a predetermined threshold or percentage of the estimated distance of the vehicle to a location of a fuel source. If the estimated vehicle range is not below or within (i.e., is outside) the predetermined threshold or percentage of the estimated distance to a fuel source location, the process may proceed to end (20).

If, however, the estimated vehicle range is below or within the predetermined threshold or percentage of the estimated distance to a fuel source location, then a determination (22) may be made as to whether the vehicle is currently operating in an economy mode. If the vehicle is currently operating in an economy mode, then the process may proceed to end (20). If the vehicle is not currently operating in an economy mode, then the vehicle could immediately enter (28) an economy mode automatically, thereby extending the vehicle range associated with the current fuel level such that the vehicle user or driver may successfully reach the location of the fuel source as a destination.

In that regard, as an example only, for a predetermined threshold of 10%, the process may proceed to end (20) if the estimated range of the vehicle is more than 110% of the estimated distance to a fuel source or location. Conversely, the vehicle could automatically enter (28) econ mode if the estimated vehicle range is less than 110% of the estimated distance to a fuel location. It should be noted, however, that any threshold or percentage could be used. Indeed, while entry of the vehicle into econ mode before the estimated vehicle range decreases below the estimated distance to a fuel location may assure the vehicle operator of reaching a fuel source location, the threshold or percentage could be set such that entry of the vehicle into econ mode takes place after the estimated vehicle range decreases below the estimated distance to a fuel location or at any other time.

Referring again to FIG. 1, alternatively, if the vehicle is not currently operating in an economy mode, a determination (24) may then be made as to whether permission to undertake an automatic entry into an economy mode has been enabled, authorized or allowed. In that regard, a vehicle driver may be provided with a vehicle setting option to enable, authorize or allow entry into an economy mode of vehicle operation upon the occurrence of certain conditions. Similarly, the vehicle driver may configure the settings of such an option to disable, de-authorize or disallow entry of the vehicle into an economy operating mode. Such an option could be provided through a vehicle configuration menu in an instrument cluster, such as may be used to set odometer distances to miles or kilometers, set temperature indications to ° F. or ° C., set events and timing for interior and exterior lighting, and set various other vehicle parameters.

If operation in an economy mode has not been authorized, then the process may again proceed to end (20). However, if an economy mode of operation has been authorized, information may then be provided (26) to the vehicle driver or user that an economy mode of vehicle operation will be entered, which may occur a predetermined period of time after such information is provided. In that regard, information provided to the driver that an economy mode of operation will commence may or may not include information regarding such a predetermined time period.

Thereafter, automatic entry (28) of the vehicle into an economy mode of operation may occur. Such automatic entry (28) into an economy operating mode may be accompanied or followed by informing the vehicle driver or user that the vehicle is entering and/or has entered a lower or degraded performance mode. As seen in FIG. 1, upon such entry (28) of the vehicle into an economy operating mode, information is provided (30) to the vehicle driver or user that the vehicle is currently operating in an economy mode.

In that regard, such information may be provided using a display on a vehicle instrument panel, or a light or other lamp indicator on a vehicle instrument cluster. However, any other type of indication could also be used, such as text and/or audible messages provided via a message center that the vehicle has entered an economy mode. Examples of such messages could be "vehicle system behavior modified for increased range," or "economy mode entered for increased range." It should also be noted that such a vehicle message center could also be used to indicate or inform a vehicle driver or user that the vehicle is about to enter an economy mode of operation due to a fuel level insufficient or approaching a level insufficient to provide a vehicle range required to reach a fuel source location, as described above (18).

Once the vehicle has entered (28) an economy mode of operation, the vehicle user or driver could be provided with an option, such as by actuating a switch, to override the economy operating mode. That is, the vehicle driver or user could provide a command to exit the economy mode of operation and enter another mode of vehicle operation, which may include returning to a normal vehicle operating mode that does not include the changes to vehicle operation associated with the economy mode, such as limiting vehicle speed, limiting vehicle acceleration, modifying vehicle acceleration response characteristics, or restricting vehicle climate control settings.

In that same regard, when information is provided (26) to the vehicle driver or user that an economy mode of vehicle operation is about to commence, the vehicle user or driver could also be provided with an option, such as by actuating a switch, to prevent entry of the vehicle into the economy operating mode. That is, the vehicle driver or user could provide a command to refrain from entering the economy mode of operation and employ another mode of vehicle operation, which may include remaining in a normal vehicle operating mode that does not include the changes to vehicle operation associated with an economy mode, such as limiting vehicle speed, limiting vehicle acceleration, modifying vehicle acceleration response characteristics, or restricting vehicle climate control settings.

Referring next to FIG. 2, a simplified flowchart depicting a method (40) for extending an operating range of a motor vehicle according to one embodiment is shown. As previously described, the vehicle may be equipped with a first mode of operation and an economy mode of operation. As seen in FIG. 2, the method (40) may comprise estimating (42) a vehicle range based on a vehicle fuel level and the first mode of vehicle operation, and estimating (44) a distance to a fuel location. The method (40) may further comprise automatically entering (46) the economy mode of vehicle operation a predetermined period of time after the estimated vehicle range decreases to within a predetermined threshold of the estimated distance to a fuel location.

The method (40) may further comprise providing (48), when the estimated vehicle range decreases to within a predetermined threshold of the estimated distance to a fuel location, an indication to a vehicle user that the vehicle will enter the economy mode of vehicle operation, and remaining (50) in the first mode of vehicle operation if, during the predetermined period of time after providing the indication, the user provides a command to refrain from entering the economy mode of operation. The method (40) may still further comprise exiting (52) the economy mode of vehicle operation after the entering the economy mode of vehicle operation in response to a user command to exit the economy mode of vehicle operation.

Referring still to FIG. 2, the method (40) for extending an operating range of a motor vehicle may also comprise receiving (54) conventional or alternative fuel locations from one of a navigation system, a user input and a learned location list for use in estimating (44) a distance to a fuel location. The method (40) may also comprise providing (56) an indication to the vehicle user that the vehicle is operating in the economy mode, and determining (58) whether an economy mode of vehicle operation is authorized, which may include receiving a user command authorizing the economy mode of vehicle operation.

As described above, the alternative fuel may comprise ethanol, propane, hydrogen for an internal combustion engine or fuel cell, electricity for a battery, natural gas, or any other type of alternative vehicle fuel other than conventional gasoline or diesel fuels. As also previously described, he economy mode of vehicle operation may comprise limiting vehicle speed, limiting vehicle acceleration, modifying vehicle acceleration response characteristics, and/or altering vehicle climate control system operation.

Referring next to FIG. 3, a system (70) for extending an operating range of a motor vehicle according to one embodiment is shown. Once again, the vehicle is equipped with a first mode of operation and a second mode of operation, which may be an economy mode of vehicle operation. As seen in FIG. 3, the system comprises a controller (72), and may also comprise a communications interface (74). The controller (72) and/or communications interface may be provided in communication with various other vehicle components and/or devices via a vehicle bus or network (76). Such other vehicle components and/or devices may include an engine control module (78), a climate control system module (80), a user interface (82), a vehicle navigation or information system (84) and/or other components or devices (not shown).

In that regard, it should be noted that the user interface (82) may include various input and output elements such as lamps, lighted icons, a message center, speakers, a microphone, a video display (which may have touchscreen capabilities), switches (such as button or stalk switches), and/or any other type of user interface device known in the art. Such input and output elements included with the user interface (82) may be provided at any appropriate location within the vehicle, such as in an instrument cluster, vehicle console or other locations. As well, such input and output elements may be provided at a single location or dispersed among multiple locations within the vehicle.

The controller (72) is provided for use in performing the various functions or operations described in detail above. These may include estimating a vehicle range based on a vehicle fuel level and the first mode of vehicle operation, estimating a distance to a fuel location, and determining whether a second mode of vehicle operation, which may be an economy mode, is authorized. Alternatively, such estimations and/or determinations may be provided to the controller (72), such as in the form of signals transmitted over the vehicle bus or network (76) and input to the controller (72), such as by the communications interface (74). The controller (72) operations may also include generating an entry command signal for use in automatically entering the second mode of vehicle operation, which may be an economy mode, after the estimated vehicle range decreases to within a predetermined threshold of the estimated distance to a fuel location.

The controller (72) operations may also include generating, when the estimated vehicle range decreases to within a predetermined threshold of the estimated distance to a fuel location, an information signal for use in providing an indication to a vehicle user that the vehicle will enter the second mode of vehicle operation, which may be an economy mode. The controller (72) operations may further include refraining from generating the entry command signal in order to remain in the first mode of vehicle operation if, during the predetermined period of time after generating the information signal for use in providing the indication, the user provides a command to refrain from entering the second mode of operation, which may be an economy mode. The controller (72) operations may still further include generating an exit command signal for use in exiting the second mode of vehicle operation, which may be an economy mode, after entering the second mode of vehicle operation in response to a user command to exit the second mode of vehicle operation. In that regard, the controller (72) may comprise a control module including one or more processors, and may include appropriate hardware, firmware and/or software for performing the operations described.

The communications interface (74) may be provided for use in outputting various signals from and inputting various signals to the controller (72). In that regard, the communications interface (74) may output from the controller (72) the previously described information signal, entry command signal, and exit command signal. Such signals may be transmitted over the vehicle bus or network (76) to an appropriate vehicle component or device, such as the engine control module (78), the climate control system module (80) and/or output elements of the user interface (82), for use in effectuating the strategy concerning extending an operating range of the vehicle as described in detail above.

The communications interface (74) may also input to the controller (72) a signal indicative of the user command to refrain from entering the second mode of operation, which may be an economy mode, and a signal indicative of the user command to exit the second mode of vehicle operation, as also previously described. In that regard, such signals may be received by the communications interface (74) over the vehicle bus or network (76) from an input element of the user interface (82), in such a fashion as previously described.

Operations of the controller (72) may also include generating, if the user fails to provide a command to refrain from entering the second mode of operation, which may be an economy mode, during a predetermined period of time after generating the information signal for use in providing the indication to the vehicle user, an entry command signal for use in automatically entering the second mode of vehicle operation, which may be an economy mode. The controller (72) operations may also include receiving conventional or alternative fuel locations from one of a navigation system, a user input and a learned locations list in order to estimate a distance to a fuel location, generating another information signal for use in providing an indication to the vehicle user that the vehicle is operating in the second mode, which may be an economy mode, and receiving a signal indicative of a user command authorizing the second mode of vehicle operation. The controller (72) operation may still further include determining whether a second mode of vehicle operation, which may be an economy mode, is authorized, which may include receiving a signal indicative of a user command authorizing the second mode of vehicle operation. In that regard, the communications interface (74) may be further configured to input to the controller such a signal indicative of a user command authorizing the second mode of vehicle operation, which may be an economy mode, as well as to input to the controller information regarding locations of conventional or alternative fuel sources, which may be received over the vehicle bus or network (76) from the vehicle navigation or information system (84), from a vehicle driver or user via the user interface (82) and/or from a stored database, table or list of learned locations.

Once again, the various signals described above that may be output from the controller (72) by the communications interface (74) may be transmitted over the vehicle bus or network (76) to an appropriate vehicle component or device, such as the engine control module (78), the climate control system module (80) and/or output elements of the user interface (82), for use in effectuating the strategy previously described concerning extending an operating range of the vehicle. Similarly, the various signals described above that may be input by the communications interface (74) to the controller (72) may be received by the communications interface (74) over the vehicle bus or network (76) from input elements of the user interface (82).

As is readily apparent from the foregoing description, a method and system for extending an operating range of a vehicle have been described, where the vehicle may have a normal mode of operation and an economy mode of operation. In that regard, an economy mode of vehicle operation may be entered automatically under certain conditions, including an estimated vehicle range and an estimated distance to a fuel source location, while still providing a vehicle driver or user the ability to manually control the vehicle operating mode as between an economy mode and other modes of operation.

While certain embodiments are illustrated and described herein, they are exemplary only and it is not intended that these embodiments describe all those possible. Rather, the words used herein are words of description rather than limitation, and it is understood that various changes may be made without departing from the spirit and scope of the following claims. Additionally, the features of various implementing embodiments may be combined to form further embodiments.

What is claimed is:

1. A method comprising:
   estimating a vehicle range based on a fuel level and a first mode of vehicle operation;
   estimating a distance to an alternative fuel location; and
   if a vehicle user has authorized an economy mode of operation, automatically entering the economy mode of vehicle operation a predetermined time after the estimated vehicle range decreases to within a predetermined threshold of the estimated distance to the alternative fuel location.

2. The method of claim 1 further comprising:
   providing, when the estimated vehicle range decreases to within the predetermined threshold of the estimated distance to a fuel location, an indication to a vehicle user that the vehicle will enter the economy mode of vehicle operation;
   remaining in the first mode of vehicle operation if, during the predetermined period after providing the indication, the user provides a command to refrain from entering the economy mode of operation; and
   exiting the economy mode of vehicle operation after the entering the economy mode of vehicle operation in response to a user command to exit the economy mode of vehicle operation.

3. The method of claim 1 wherein the alternative fuel comprises one of ethanol, hydrogen, electricity for a battery, and natural gas.

4. The method claim 1 wherein the economy mode of vehicle operation comprises one of limiting vehicle speed, limiting vehicle acceleration, modifying vehicle acceleration response characteristics, and altering vehicle climate control system operation.

5. The method of claim 1 wherein estimating a distance to a fuel location comprises receiving fuel locations from one of a navigation system, a user input and a learned locations list.

6. The method of claim 1 further comprising providing an indication to the vehicle user that the vehicle is operating in the economy mode.

7. A system comprising a controller configured to:
   estimate a vehicle range based on a fuel level and a first mode of vehicle operation; estimate a distance to a location of an alternative fuel;
   determine if a vehicle user has set an option authorizing an economy mode of vehicle operation; and
   if a vehicle user has authorized the economy mode of vehicle operation, generate an entry command signal for use in automatically entering the economy mode of vehicle operation after the estimated vehicle range decreases to within a predetermined threshold of the estimated distance to the fuel location.

8. The system of claim 7 further comprising:
   a communications interface configured to output from the controller the information signal and the entry command signal;
   wherein the controller is further configured to
   generate, when the estimated vehicle range decreases to within the predetermined threshold of the estimated distance to the fuel location, an information signal for use in providing an indication to a vehicle user that the vehicle will enter the economy mode of vehicle operation,
   refrain from generating the entry command signal in order to remain in the first mode of vehicle operation if, during the predetermined period after generating the information signal for use in providing the indication, the user provides a command to refrain from entering the economy mode of operation, and
   generate an exit command signal for use in exiting the economy mode of vehicle operation after entering the economy mode of vehicle operation in response to a user command to exit the economy mode of vehicle operation;
   and wherein the communications interface is further configured to input to the controller a signal indicative of the user command to refrain from entering the economy mode of operation and a signal indicative of the user command to exit the economy mode of vehicle operation, and to output from the controller the exit command signal.

9. The system of claim 7 wherein the alternative fuel comprises one of ethanol, hydrogen, electricity for a battery, and natural gas.

10. The system of claim 7 wherein the economy mode of vehicle operation comprises one of limiting vehicle speed, limiting vehicle acceleration, modifying vehicle acceleration response characteristics, and altering vehicle climate control system operation.

11. The system of claim 7 wherein, to estimate a distance to a fuel location, the controller is further configured to receive fuel locations from one of a navigation system, a user input and a learned locations list.

12. The system of claim 7 wherein the controller is further configured to generate another information signal for use in providing an indication to the vehicle user that the vehicle is operating in the economy mode.

13. A system comprising a controller configured to:
   estimate a vehicle range based on a fuel level and a first mode of vehicle operation;
   estimate a distance to a location of a fuel source;
   determine if a vehicle user has set an option authorizing an economy mode of vehicle operation;
   if a vehicle user has authorized the economy mode of vehicle operation, generate, when the estimated vehicle range decreases to within a predetermined threshold of the estimated distance to the fuel location, an information signal for use in providing an indication to a user that the vehicle will enter the economy mode of vehicle operation;
   generate, if the user fails to provide a command to refrain from entering the economy mode during a predetermined time after generating the information signal, an entry command signal for use in automatically entering the economy mode; and
   generate an exit command signal for use in exiting the economy mode in response to a user command to exit the economy mode.

14. The system of claim 13 wherein the vehicle fuel is an alternative fuel comprising one of ethanol, hydrogen, electricity for a battery, and natural gas.

15. The system of claim 13 wherein the economy mode of vehicle operation comprises one of limiting vehicle speed, limiting vehicle acceleration, modifying vehicle acceleration response characteristics, and altering vehicle climate control system operation.

16. The system of claim 13 wherein, to estimate a distance to a location of a source of vehicle fuel, the controller is further configured to receive fuel source locations from one of a navigation system, a user input and a learned locations list.

17. The system of claim 13 wherein the controller is further configured to generate another information signal for use in providing an indication to the vehicle user that the vehicle is operating in the economy mode.

18. The system of claim 13 further comprising a communications interface configured to output from the controller the information signal, entry command signal, and exit command signal, and to input to the controller signals indicative of user commands to refrain from entering the second mode of operation, and to exit the economy mode of operation.

\* \* \* \* \*